Feb. 13, 1962

L. F. MAYLE 3,021,073

DYNAMIC FOCUSING

Filed May 14, 1956

2 Sheets-Sheet 1

INVENTOR.
LOUIS F. MAYLE

BY George A. Gust

ATTORNEY

Feb. 13, 1962 L. F. MAYLE 3,021,073

DYNAMIC FOCUSING

Filed May 14, 1956 2 Sheets-Sheet 2

INVENTOR.
LOUIS F. MAYLE

BY George A. Gust
ATTORNEY 3,021,073

DYNAMIC FOCUSING

Louis F. Mayle, Fort Wayne, Ind., assignor to International Telephone and Telegraph Corporation Filed May 14, 1956, Ser. No. 584,668
10 Claims. (Cl. 235—192)

This invention relates to dynamic focusing circuits for cathode ray tubes and is particularly directed to means for altering the focusing field or flux for an electron beam as a function of radial displacement of the beam on an extended planar target from the normal undeflected position of the beam at the center of the target.

In image dissectors, kinescopes, and cathode ray tubes generally wherein a beam source, or an aperture, is at a fixed point approximately on a perpendicular line extending from the center of a planar target, the beam length will vary as a function of the radial distance from the target center to the intersection of the beam with the target. The only readily available information concerning the location of that point is found in the horizontal and vertical deflection voltages.

The object of this invention is to provide a simple circuit for sampling the orthogonal deflection voltages or currents of a cathode ray tube, deriving a voltage proportional to the radial deflection, and then appropriately and dynamically modifying the focusing flux.

The objects of this invention are attained in a dynamic focusing circuit, for a cathode ray beam scanning an extended planar target area, having orthogonal beam deflection elements and a beam focusing element and having means to vary the total focusing parameters as a function of radial deflection of the beam from a mean position of the beam at the center of the target; characterized in this that plus or minus voltages analogous to beam deflections above and below said target center and plus or minus voltages analogous to beam deflections to the right or left of said target center are applied respectively to polarity inverters to produce two voltages of a common polarity; computing circuits for effectively adding and yielding the root-mean-square value of the added voltages; and means for applying the resultant voltage to the beam focusing means.

The above-mentioned and other features and objects of this invention and the manner of attaining them will become more apparent and the invention itself will be best understood by reference to the following description of an embodiment of the invention taken in conjunction with the accompanying drawings, wherein.

Figures 1, 2, 3:
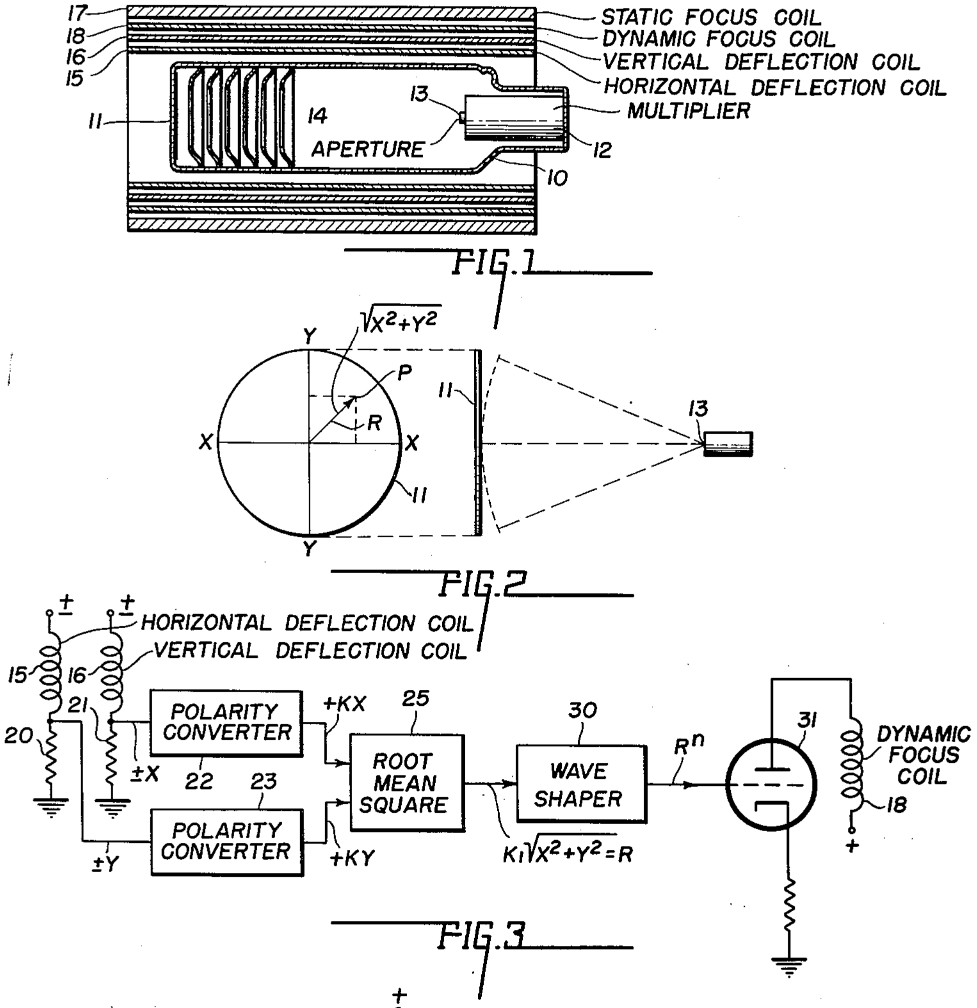
FIG. 1 is a longitudinal sectional view of one cathode ray tube adapted to this invention.
FIG. 2 is a geometric diagram of beam motion in a typical cathode ray tube.
FIG. 3 is a block diagram of the dynamic focusing circuit of this invention.

The block diagram of FIG. 3 shows the principal elements of this invention. The currents of the horizontal and vertical deflection coils 15 and 16 are sampled as by the series load resistors 20 and 21. The plus and minus deflection voltages are, respectively, converted to voltages of one polarity in the converters 22 and 23. Thereupon the two converted voltages are combined to derive their root-mean-square value in the computer 25. After modification of the root-mean-square value, the wave is applied through amp'ifier 31 to the dynamic focusing coil 18, the flux of which is superimposed upon the flux of deflection coils 15 and 16.

The image dissector tube shown in section in FIG. 1 is illustrated as one example of a cathode ray tube to which the dynamic focusing circuits of this invention may be applied. The dissector comprises an envelope 10 having a photoemissive planar cathode or target 11 at one end. At the other end of the envelope is the multiplier assembly 12 open only at one end through a small aperture 13. Accelerating and focusing rings 14 are concentric with the envelope and propel an electron image, corresponding to the optical image focused upon photocathode 11, axially along the envelope. As the electron image is deflected in two orthogonal directions by the horizontal deflecting coil 15 and the vertical deflecting coil 16, electrons of elemental areas of the image enter aperture 13. The multiplier multiplies the electron signal thus received and passes the signal on to the usual video amplifying circuits. The electron image is primarily focused by the static focusing coil 17, the flux of which is modified up to about 5% by the dynamic focusing coil 18. The dynamic focusing coil flux is necessary to focus the elemental electron image at the periphery of the target onto the aperture when a high degree of resolution is required, using very small aperture openings, such as .001" x .001".

In FIG. 2 is shown the geometry of a typical cathode ray tube with the aperture 13, or the point source of an electron gun, fixed on a line perpendicular to the target 11 and opposite the center of the target. The target plane is tangential to one point only of the spherical surface defined by a fixed length beam pivoting about point 13. It is thus apparent that the beam is de-focused at all points on the target except at the center, and that the de-focus is a function of the radial distance of the beam from center.

Let it be assumed that the beam is deflected horizontally along axis XX and is deflected vertically along right angle axis YY. Currents in deflection coils 15 and 16 are functions respectively of beam deflections along axes XX and YY. The radial distance from the center of the target to the point P along line R is proportional to $\sqrt{X^2+Y^2}$.

As suggested in FIG. 3, the current in the two deflecting coils 15 and 16 may be sampled by tapping across resistors 20 and 21 connected respectively in series with the deflecting coils. The voltages thus obtained are proportional to the deflections $\pm$X and $\pm$Y. The deflecting voltages must be zero when the beam is at the center. The X and Y voltages of either polarity are fed first to the polarity converters 22 and 23 for converting each voltage to an equal or an analogous voltage of one polarity. The output of converter 22 is analogous in amplitude to the input voltage but is of one sign only. These output voltages may be greater than or less than the input voltages by the constant factor K.

In the computer shown generally at 25 the X and Y voltages are combined to produce the root-mean-square value of those two voltages. Computer 25 in effect squares each of the voltages X and Y, adds them, and then extracts the square root of the sum thereof. Similar computers have been designed in the past, one being shown in vol. 19 of "Wave Forms" of the Radiation Laboratory Series, pages 678–691. A much simplified root-mean-square device is hereinafter described in connection with FIG. 5. The root-mean-square value, which is proportional to R, is applied to the wave shaper 30 for modifying the R voltage in accordance with the focusing parameters of the particular cathode ray to be serviced. Usually the beam focus voltage is an exponential function of radial distance, R. The output of the wave shaper hence is proportional to $K_2R^n$. After suitable amplification at 31, $R^n$ current is applied to the dynamic focusing coil 18.

Figure 4:
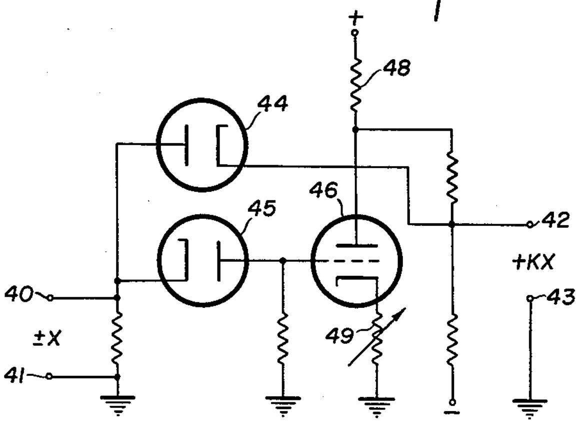
FIG. 4 is a circuit diagram of a polarity converter embodied in this invention.

FIG. 4 shows one example of a polarity converter constructed according to this invention. Since the two converters 22 and 23 are identical, one only need be described. The voltage ±X at the input terminals 40 in 41 appears as +KX at the output terminals 42 and 43. The two rectifiers 44 and 45 are connected in parallel between the input and output terminals. The polarity of the rectifiers is reversed with respect to each other and the input terminals. Where the rectifiers are diodes, rectifier 44, for example, could be connected with the cathode directly to one output terminal so that a +X applied to the anode of tube 44 appears as +KX at terminal 42. Rectifier 45 remains open circuited. If a —X is applied at terminal 40, rectifier 45 conducts but the signal must be inverted in phase and is applied to the grid of the triode 46 having a plate load 48. Variation and anode potential of triode 46 is opposite in phase to variations of its grid voltages. The gain of triode 46 is easily adjusted by the anode load resistor 48 and/or the cathode resistor 49 to produce a voltage at terminal 42 equal in amplitude to a +X voltage applied thereto through diode 44.

Figure 5:
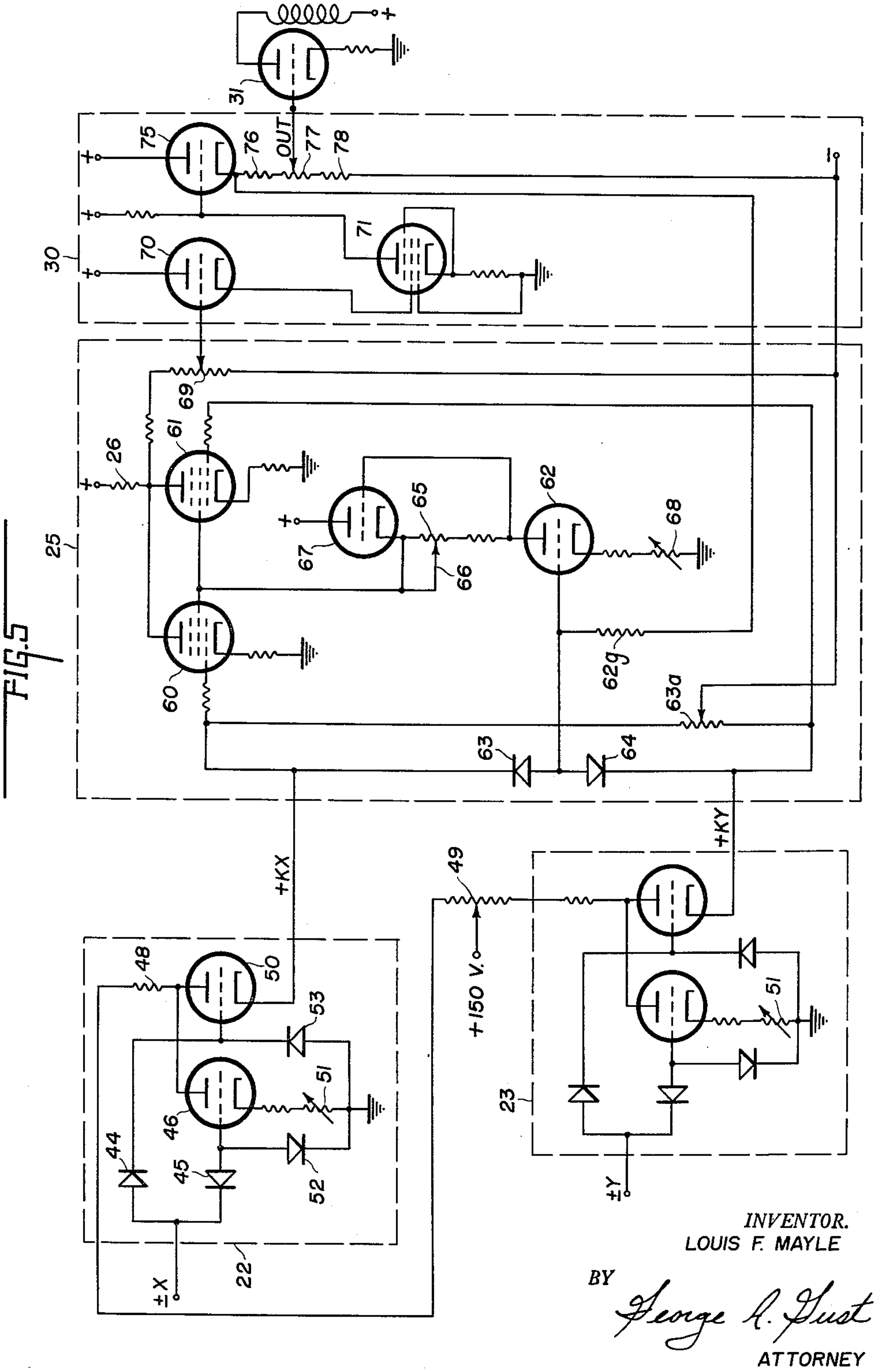
FIG. 5 is a circuit diagram of one embodiment of the block diagram of FIG. 3.

An alternative polarity converter is shown in FIG. 5 where the diodes 44 and 45 are connected in parallel between the input terminal X and the output terminal KX. Here the triode 46 serves as an inverter as in FIG. 4 but the anode load resistor 48 is common to the anode of triode 50. +X voltages move through rectifier 44 directly to the grid of triode 50 whereas —X voltages move through diode 45, are inverted in polarity by triode 46, and are then applied as a plate driving voltage to the anode of tube 50. The cathode bias of tube 46 is modified by resistor 51 to make the gain through the two parallel paths equal. The ±Y voltages are inverted similarly in the converter 23.

Diodes 52 and 53 are found desirable to clamp the quiescent circuit to ground, when its respective input diode opens.

In FIG. 5 the computer 25 comprises two multi-grid amplifier tubes 60 and 61 preferably of the pentode type for performing the function of transforming the Cartesian coordinates to a radius value, R. This computation is closely approximated by the nonlinear addition of the two voltages representing X and Y. The voltage representing X is impressed upon the control grid of pentode 60 and the voltage representing Y is impressed upon the control grid of pentode 61.

According to an important feature of this invention, the smaller voltage only of KX and KY is impressed on the screen grids of pentodes 60 and 61, through the triode 62 and the arrangement of diodes 63 and 64. The diodes are connected back-to-back with the anodes thereof connected together and to the control grid of triode 62, and with the two cathodes thereof connected respectively to the two sources, +KX and +KY. The common anode connection is biased to some positive value through the high value grid leak resistor 62*g*, and the cathodes in their quiescent state are similarly biased so that the voltage across the diodes is normally zero. The high value resistor 62*g* should be connected to a positive voltage, which connection has conveniently been found to be at the cathode of the cathode follower 75. It will be seen hereinafter that the cathode follower voltage changes in the proper direction with respect to changes at the anodes of diodes 63 and 64 to reduce delay in changes of the grid of triode 62 caused by stray capacities.

Diodes 63 and 64 of FIG. 5 permit only the smaller of the two voltages KX and KY to be impressed upon the grid of triode 62. If, for example, either KX or KY is zero, the anode of the diode associated with the zero voltage cannot go positive, but the other diode will "open" (become non-conductive) with its cathode going positive. Thus there will be no voltage change impressed on the grid of triode 62 from either KX or KY and the gain of pentodes 60 and 61 is not attenuated. If KX and KY go positive by different amounts the anodes of the diodes can go positive by the amount of the smaller of KX and KY. That is, the diode associated with the smaller voltage remains "closed" (conductive) and the diode associated with the larger voltage is "opened" (non-conductive).

Current through triode 62 and its plate load resistor 65 controls the screen voltage of both pentodes and hence controls the gain of the pentodes. By the adjustable contact 66 the range of screen voltage is variable. Amplification of these voltage changes on the screens may be obtained if desired by the second triode 67 connected as shown between a high voltage source and the upper end of the load resistor 65.

The smaller value of KX or KY is used to reduce the gain of the parallel pentodes for the reasons indicated by the following example: In the extreme case, the KX and KY values are equal and the square root of the sum of the squared values of KX and KY must equal 1.41 ($\sqrt{2}$) where KX and KY are each 1. If the gain of parallel pentodes 60 and 61 were not reduced, the summation of 1+1 would produce in the parallel anode circuits of 61 and 62 a voltage equal to 2. But in this case the grid of triode 62 is increased by 1, since the cathodes of both diodes 63 and 64 raise by an equal amount, decreasing the screen voltage of the pentodes sufficiently so that the gain is actually 1.41 and not 2. Since the load resistor 26 is common to the two pentodes and their outputs add arithmetically, the gain of each pentode should be one-half of 1.41, or .707, to produce the root-mean-square of KX and KY of equal value.

Consider now the case where KX and KY are equal to 3 and 4 respectively. The sum without altering the pentode gain would be 7. But it should be only 5 for the proper root-mean-square. Hence the gain of the pentodes should be changed by 5/7 or .714.

It is found that adjustment of potentiometers 65 and 68 produce the desired nonlinear change in pentode gain to produce the above mentioned $X+Y$ to $\sqrt{X^2+Y^2}$ relationship.

Potentiometers 49 and 63*a* with adjustable tap and cathode resistors are easily adjusted to balance the system with no signals present.

The radius value, R is applied to the wave shaper 30 by an adjustable output tap on the load resistor 69 coupled to the amplifier 70. The output of amplifier 70 is preferably coupled to the screen grid of the pentode 71. The pentode 71 provides the correct relation between the radius vector and the dynamic focus current, the voltage change in the plate circuit of pentode 71 being proportional to the dynamic focused current in the instantaneous value radius vector on the grid. The variable voltage divider 69 from the plates of the radius vector circuit feeds the grid of the cathode follower 70, whose output supplies the screen of the pentode 71. Proper shaping is effected by varying resistor 69 of the voltage divider thus varying the screen operating point. Driving the screen of pentode 71 proved to be more effective in shaping than in driving the control grid. This mode of operation is also more beneficial from the standpoint of direct current stability in that driving the control grid would require attenuation of the signal representing the radius vector, and the direct current setting of the control grid would be more critical.

The plate of the shaping circuit directly connects to the grid of the cathode follower 75 which drives a variable voltage divider 76, 77 and 78 that feeds the grid of the output tube 31. A cathode follower is used in order not to attenuate the A.C. signal and yet obtain the proper shift in D.C. level between the plate of tube 71 and the grid of tube 31. Potentiometer 77 sets the minimum value of current when X and Y are zero in the dynamic focus coil.

While I have described above the principles of my invention in connection with specific apparatus, it is to be clearly understood that this description is made only by way of example and not as a limitation to the scope of my invention.

What is claimed is:

1. In combination in a device for generating a voltage approximately proportional to the hypotenuse of a right angle triangle, two sources of voltages analogous, respectively, to the length of the right-angle legs of said triangle; two multiple-grid amplifier tubes having control grids, screen grids and anodes respectively, said sources being coupled, respectively, to the control grids thereof, the screen grids being connected in parallel, and the anodes being connected in parallel to an output terminal; and means for varying the gain of said tubes in response to the level of the smaller of the two voltages from said sources comprising two unidirectionally conducting devices having anodes and cathodes respectively, the last-mentioned anodes being connected together, means connecting said last-mentioned anodes to said screen grids for varying the voltage on the latter inversely with respect to voltage changes on said last-mentioned anodes, means applying a biasing potential to said last-mentioned anodes, and means coupling the last-mentioned cathodes to said two sources, respectively.

2. A computer for solving the hypotenuse of a right-angle triangle where the two right-angle legs of the triangle are given, comprising two multiple-grid amplifiers having anodes respectively, a common output circuit coupled to the anodes, two sources of voltage analogous in amplitude to the length of said two legs, respectively, a first grid of each amplifier being coupled, respectively, to said two sources, a second grid of each amplifier being coupled in parallel and to a variable voltage source to vary the gain of said amplifiers, said variable voltage source comprising means coupled to said two sources responsive to the lesser of said analogous voltages to impress on said second grids a voltage corresponding to said lesser voltage.

3. In the circuits defined in claim 2, two diodes, said variable voltage source comprising an amplifier tube with an output circuit coupled to the second-mentioned grids and with a control electrode coupled through said diodes, respectively, to the sources of said analogous voltages.

4. A circuit for extracting the approximate square root of the sum of two square values of two voltages, comprising two pentodes, a common load resistor in the anode circuits of the pentodes, means for applying said two voltages, respectively, to the control grids of the pentodes, a voltage source connected to the two screen grids of the pentodes, means responsive to the lesser of said two voltages for varying said voltage source and the potential of the screen grids by an amount which controls the gain of said pentodes to yield the square root of the sum of the square values of said two voltages.

5. A circuit for computing the root-mean-square value of two voltages comprising two pentode-type tubes the gain of which varies with screen potential, means applying said two voltages to the control grids of said tubes, two diodes connected back-to-back and to said two control grids, the common connection of the diodes being biased through a load resistor so that said common connection will vary in potential in response only to the smaller of said two voltages; and means connected between said common connection and the screens of said pentodes to change the gain of both tubes in response to the smaller of said two voltages, and the anodes of said tubes being connected in parallel to a common load impedance with an output circuit connected to the parallel anodes.

6. A computer for solving the hypotenuse of a right triangle in which the legs of the triangle are given, comprising two multiple-grid amplifiers having anodes respectively, a common output circuit coupled to said anodes, two sources of voltage analogous in amplitude to the length of said two legs, respectively, first grids of said amplifiers being coupled, respectively, to said two sources, second grids of said amplifiers being coupled together and to a variable voltage source, said variable voltage source comprising an amplifier having anode and control grid circuits, said anode circuit being coupled to said second grids, and means coupled between said control grid circuit and said two sources, respectively, responsive to the lesser of said two analogous voltages to vary said variable voltage source by an amount which controls the gain of said amplifiers to yield an output signal which corresponds to said hypotenuse.

7. A computer for solving the hypotenuse of a right triangle in which the legs of the triangle are given, comprising two multiple-grid amplifiers having anodes respectively, a common output circuit coupled to said anodes, two sources of voltage analogous in amplitude to the length of said two legs, respectively, first grids of said amplifiers being coupled, respectively, to said two sources, second grids of said amplifiers being coupled together and to a variable voltage source, said variable voltage source comprising a third amplifier having anode and control grid circuits, said anode circuit being coupled to said second grids, and two unidirectionally conducting devices having anodes and cathodes, respectively, the last-mentioned anodes being connected together and to said control grid circuit, the last-mentioned cathodes being coupled, respectively, to said two sources, means biasing said last-mentioned anodes, and means including said third amplifier responsive only to the lesser of said two analogous voltages for controlling the gain of said amplifiers to yield an output signal which corresponds to said hypotenuse.

8. A computer for solving the hypotenuse of a right triangle in which the legs of the triangle are given, comprising two multiple-grid amplifiers having anodes respectively, a common output circuit coupled to said anodes, two sources of voltage analogous in amplitude to the length of said two legs, respectively, first grids of said amplifiers being coupled, respectively, to said two sources, second grids of said amplifiers being coupled together and to a variable voltage source, said variable voltage source comprising an amplifier having anode and control grid circuits, said anode circuit being coupled to said second grids, and two unidirectionally conducting devices having anodes and cathodes, respectively, the last-mentioned anodes being connected together and to said control grid circuit, the last-mentioned cathodes being coupled, respectively, to said two sources, means biasing said last-mentioned anodes, and two potentiometers in said anode and cathode circuits, respectively, for adjusting the voltage applied to said second grids to a value which renders the output signal of said amplifiers approximately equal to said hypotenuse.

9. A computer for solving the hypotenuse of a right triangle in which the legs of the triangle are given, comprising two multiple-grid amplifiers having anodes respectively, a common output circuit coupled to said anodes, two sources of voltage analogous in amplitude to the length of said two legs, respectively, first grids of said amplifiers being coupled, respectively, to said two sources, second grids of said amplifiers being coupled together, a third amplifier having anode, control grid and cathode circuits, a first potentiometer in said anode circuit and coupled to said second grids, a second potentiometer in said cathode circuit for varying the gain of said third amplifier, a pair of diodes having the anodes thereof connected together and to said block grid circuit, means biasing said control grid circuit, the cathodes of said two diodes being connected, respectively, to said two sources, and means biasing said two amplifiers in response to a signal voltage in said anode circuit to control the gain of said two amplifiers whereby the output signal of said two amplifiers corresponds to said hypotenuse.

10. A computer for solving the hypotenuse of a right triangle in which the legs of the triangle are given, comprising two multiple-grid amplifiers each having an anode and a cathode, a common output circuit coupled to said anodes, a biasing impedance in circuit with each cathode, two sources of voltage analogous in amplitude to the length of said two legs, respectively, first grids of said amplifiers being coupled, respectively, to said two sources, second grids of said amplifiers being coupled together and to a variable voltage source, said variable voltage source comprising a third amplifier having anode and control grid circuits, said anode circuit being coupled to said second grids, and means coupled between said control grid circuit and said two sources, respectively, responsive to the lesser of said two analogous voltages to vary said variable voltage source by an amount which controls the gain of said two amplifiers to yield an output signal which corresponds to said hypotenuse.

References Cited in the file of this patent

UNITED STATES PATENTS

| | | |
|---|---|---|
| 2,472,165 | Mankin | June 7, 1949 |
| 2,617,588 | Dobbins | Nov. 11, 1952 |
| 2,658,164 | Grunwald | Nov. 3, 1953 |
| 2,661,152 | Elias | Dec. 1, 1953 |
| 2,688,442 | Droz et al. | Sept. 7, 1954 |
| 2,762,914 | Peterson et al. | Sept. 11, 1956 |
| 2,764,679 | Berkowitz | Sept. 25, 1956 |
| 2,903,577 | Adams | Sept. 8, 1959 |
| 2,922,116 | Crosby | Jan. 19, 1960 |

UNITED STATES PATENT OFFICE

CERTIFICATE OF CORRECTION

Patent No. 3,021,073 February 13, 1962

Louis F. Mayle

It is hereby certified that error appears in the above numbered patent requiring correction and that the said Letters Patent should read as corrected below.

Column 6, line 66, for "block" read -- control --.

Signed and sealed this 12th day of June 1962.

(SEAL)
Attest:

ERNEST W. SWIDER
Attesting Officer

DAVID L. LADD
Commissioner of Patents